Nov. 5, 1957 K. RATH 2,812,428

PASSIVE RESPONDER RADIO SYSTEM

Filed Sept. 27, 1954 4 Sheets-Sheet 1

INVENTOR

Nov. 5, 1957 K. RATH 2,812,428

PASSIVE RESPONDER RADIO SYSTEM

Filed Sept. 27, 1954 4 Sheets-Sheet 2

INVENTOR

Karl Rath

INVENTOR

Karl Rath

INVENTOR
Karl Rath 2,812,428

PASSIVE RESPONDER RADIO SYSTEM

Karl Rath, New York, N. Y., assignor to Radio Patents Company, New York, N. Y., a partnership of New York Application September 27, 1954, Serial No. 458,551

4 Claims. (Cl. 250—6)

The present invention relates to remote control radio systems, more particularly to passive responders which require no power or local source of energy and an important object of the invention is the provision of a system of this type whereby reception of the passive signals by unauthorized persons or listeners is substantially prevented.

Among the more specific objects of the invention is the provision of a master transmitter-receiver for cooperation with a distant responder or control device and designed to enable transmission and reception of high frequency signaling pulses upon reflection and control by said responder or control device efficiently and substantially without interference between the transmitted and reflected pulses.

The invention, both as to its further objects and novel aspects, will be better understood from the following detailed description taken in conjunction with the accompanying drawings, forming part of this specification and wherein.

Like reference characters identify like parts and elements in the different views of the drawings.

Figure 1:
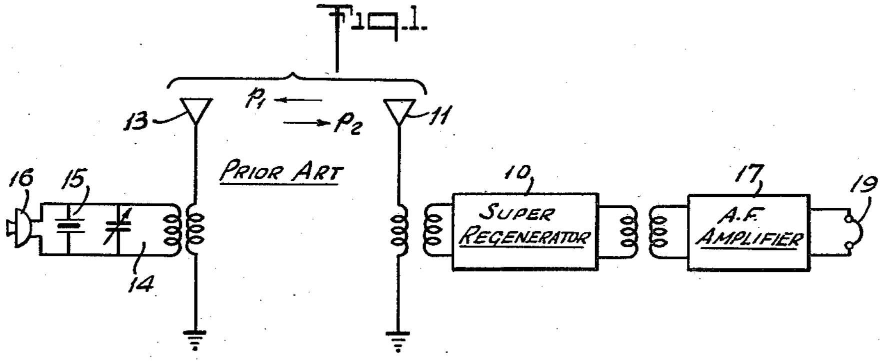
Fig. 1 is a diagram of a known type of passive responder communication or control link according to the prior art.

According to a previous system of passive radio signaling, as described in L'Onde Electrique No. 317–318, August–September 1953, pages 533 to 539, in an article by L. and R. de Magondeaux entitled "Repondeur passif de radar," and principally illustrated in Fig. 1, a pulsed master transmitter-receiver 10 in the form of a self-quenched superregenerative oscillator located at a first point or station serves to energize an antenna 11 to emit a series of high frequency (R. F.) pulses or wave trains indicated by the arrow $p_1$ in the drawing and following each other at a predetermined rate or repetition frequency determined by the quench frequency of the superregenerator 10. The wave trains or pulses $p_1$ are received at a second remote point by a passive responder or receiver-transmitter comprising an antenna 13 coupled to a receiving circuit 14 which includes a piezoelectric crystal 15 and a control or modulating device 16 such as a microphone, telegraph key, etc. shunted across the crystal to act as an absorption microphone in the example illustrated.

In a system of this type, the steady plate current of the superregenerator 10 varies according to the signal or control effected by the device 16, that is, between upper and lower limits in the case of a control key, relay, etc. or in accordance with the variations of sound or other modulating signals exciting the microphone 16 or equivalent modulating device. No source of local power is required in the responder which acts as a remote control of the transmitter or superregenerator 10.

The operation of a passive responder of the above type is based on the function of the piezoelectric crystal as a delay device or reverberator to effect a delay of the primary or received pulses $p_1$ sufficiently to cause re-transmission thereof as secondary or reflected pulses $p_2$ during the intervals between the primary pulses. In other words, the secondary pulses $p_2$ being reflected purely electrically and received by the superregenerator 10 coincide with the instants of maximum receiver sensitivity prior to the initiation of the oscillations during each quenching or operating cycle. In other words, the signal pulses $p_2$ of reduced amplitude reflected by the antenna 13 and retransmitted to the superregenerator 10, act as conditioning signals controlling the oscillations in accordance with the operation of a conventional superregenerative receiver.

The crystal 15 serves as a delay device for the reflected or re-transmitted pulses and, for this purpose, may be coupled closely with the input (antenna) circuit to result in coupling oscillations and, in turn, a delayed or secondary resonance peak of the receiving circuit. Alternatively, the crystal may be excited by the received R. F. pulses at a suitable harmonic of its fundamental frequency, to act in the manner of an echo box or supersonic reverberation chamber, whereby to cause the reverberated or reflected pulses $p_2$ to be time-separated from the transmitted pulses $p_1$ and to arrive at the instants of maximum sensitivity of the superregenator 10.

While a piezoelectric crystal has been shown as a delay device, it is understood that other known delay means may be used to cause the secondary or reflected pulses $p_2$ to coincide with the intervals between the transmitted pulses $p_1$ in an effort to effect most efficient and optimum excitation of the superregenerator receiver.

The demodulated output signals of the superregenerator 10 may be further amplified by means of an audio amplifier 17 energizing a loudspeaker, telephone or other output or translating device 19.

In the case of a self-quenched superregenerator, the effect of the reflected signal pulses $p_2$ is to advance or retard the initiation of the oscillating pulses $p_1$ in such a manner as to cause a variation of the pulse repetition or quenching frequency of the superregenerator. By varying the amplitude of the reflected pulses $p_2$ by the control device 16, the quench frequency will be varied accordingly, whereby to result in a proportionate change in the steady plate current of the oscillator in accordance with the well-known operation of a superregenerative receiver.

Figure 2:
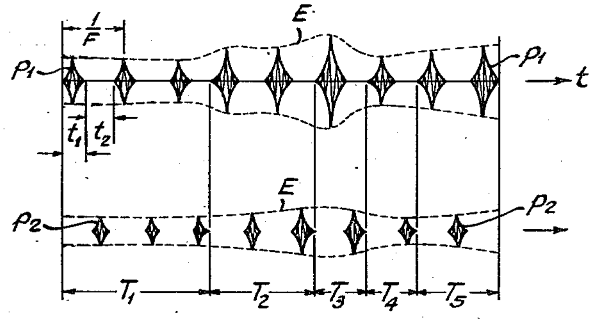
Fig. 2 is a theoretical diagram explanatory of one aspect of the improvement provided by the invention.

In the system of the above type, the transmitted pulses $p_1$ may be received by an unauthorized listener by means of a suitable receiver tuned to the carrier frequency of the superregenerator 10, due to the fact that the emitted pulses are modulated in accordance with the signal variations or modulation effected by the control device 16 of the responder. This applies both to self-quenched and separately quenched superregenerators and will be further understood by reference to Fig. 2 which shows the case of a separately quenched superregenerator.

In a separately quenched superregenerator operating in the so-called linear mode, the circuit parameters and the quenching frequency are so adjusted as to cause the oscillating pulses $p_1$ to build up to a peak below the saturation point of the oscillator tube and to decay to zero within a pulse or quenching cycle 1/F, wherein F represents the quench or pulse repetition frequency. Provided a proper adjustment of the delay of the pulses by the remote responder, high frequency pulses $p_1$ are thus transmitted during the first part $t_1$ of the quenching cycles and reflected pulses $p_2$ are received during the intervals $t_2$ between the transmitted pulses upon reflection and retransmission by the responder, in the manner described above. The received pulses act to condition the superregenerator prior to the initiation of the oscillations, in such a manner as to control the pulse amplitude and to result in an envelope E of the peaks of the pulses $p_1$ corresponding to the variations of the voltage or current produced by the microphone 16 or other signaling device at the responder or remote control station. Thus, assuming the signal to have a constant amplitude during the time period $T_1$, transmitted pulses $p_1$ and received pulses $p_2$ of constant amplitude are produced as shown in the drawing. As the pulse amplitude varies according to the modulation, as shown during time periods $T_2$ to $T_5$, the peak amplitudes of the transmitted and received pulses $p_1$ and $p_2$ will vary accordingly, in such a manner as to produce a final detected signal applied to the amplifier 17 which varies substantially in proportion to the signal variations or control effected by the microphone or equivalent control device 16.

In a practical example using a piezoelectric crystal as a memory or delay device, the signal or carrier frequency may be 50 megacycles and the quench or pulse repetition frequency may be 50 kilocycles, the latter being above the highest modulation frequency component in case of speech signals being transmitted by the distant responder. Higher frequencies may be used by operating the crystal at a harmonic frequency having sufficient power output of the re-transmitted or reflected signal pulses.

In order to provide the secrecy of transmission in a system of the above type, there is used at the master station, according to one aspect of the invention, a separately quenched superregenerative oscillator together with means for suppressing the modulation of the oscillating pulses $p_1$ prior to their radiation by the antenna 11, while the reflected pulses $p_2$ are received and applied separately to the superregenerator for demodulation in the manner described and understood.

In order to achieve this object and result, the transmitted pulses $p_1$ are passed through an amplitude limiter prior to their radiation by the antenna 11, to eliminate the modulation of the pulses and to thus make it impossible for an unauthorized receiver of the pulses $p_1$ to receive the signals transmitted by the responder. The reflected signal pulses $p_2$ are received separately and applied to the superregenerator independently of the transmitted pulses for amplification and detection in the manner described.

Figure 3:
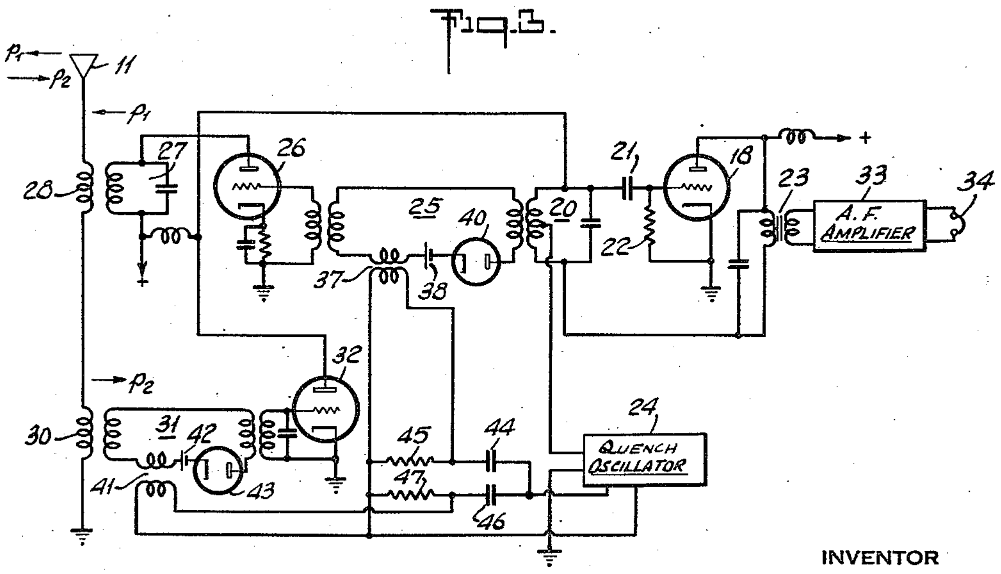
Fig. 3 is a circuit diagram of a superregenerative transceiver designed for use in connection with a remote responder or control device in accordance with the invention.

A circuit of this type is shown in Fig. 3 including a conventional separately quenched superregenerator comprised of a three-electrode vacuum tube 18 and an oscillatory tank circuit 20 connected between the plate and grid of the tube through a grid coupling condenser 21 and a grid leak resistance 22. In order to produce regeneration, a suitable tap point of the tank circuit inductance is connected to the cathode or ground through a separate quenching oscillator 24. The generated high frequency pulses are applied by way of a switching circuit 25 to the input of a limiter-amplifier stage 26 having a resonant circuit 27 connected in its plate circuit and arranged in inductive coupling relation with an antenna coupling coil 28. The antenna circuit includes a further coupling coil 30 for receiving the reflected signal pulses $p_2$ which are applied to the grid of the superregenerator 18 by way of a further switching circuit 31 and a decoupling amplifier tube 32.

The switching circuit 25, in the example shown, includes the primary of a control transformer 37, a biasing source or battery 38 and a diode or rectifier 40, all connected in series, the battery 38 normally blocking the diode or equivalent rectifier. Similarly, the switching circuit 31 comprises the primary of a control transformer 41, a biasing battery 42 and a diode or rectifier 43. The switching circuits 25 and 31 are rendered alternately conductive and non-conductive by the application through transformers 37 and 41 of a suitable alternating control voltage or current derived from the quenching oscillator 24 through suitable RC coupling networks 44, 45 and 46, 47, respectively. With the diodes 40 and 43 in the switching circuits being biased by the batteries or equivalent biasing potential sources 38 and 41 in the current blocking direction to normally offer a high impedance by the circuits, application of a quenching voltage of proper amplitude by the transformers 37 and 41 will result in an alternate increase and decrease of the diode impedance during the half cycles of the switching or quench frequency of the superregenerator.

More particularly, the phase or polarity of the control voltage applied to the switching circuits is such as to cause the circuit 25 to be conductive while the circuit 31 is non-conductive and vice-versa. In this manner, the transmitting and receiving channels are substantially decoupled, whereby to prevent the transmitted pulses from entering the receiver by way of the coupling coil 30 and to prevent the received signals applied to the superregenerator 18 from being returned to the antenna circuit by way of amplifier 26. In other words, closed circuits or feedback loops liable to cause regeneration or to impair the stability of the system are substantially avoided.

The amplifier 26 is operated as an amplitude limiter by proper adjustment of its operating and bias potentials, to equalize or remove the amplitude modulation from the transmitted R. F. pulses $p_1$, that is, in other words, to radiate pulses of constant or equal amplitude and to thus prevent an unauthorized listener from receiving the signals transmitted by the distant responder station. Alternatively, the amplifier 26 may be operated as a conventional R. F. power stage and the bias voltage 38 of the switching circuit 25 adjusted to cause the circuit to act as an amplitude limiter or clipper in addition to its function as a switching device, to remove the amplitude modulation from the pulses $p_1$ radiated by the antenna 11. The quench oscillator 24 may be a conventional sinusoidal oscillator or a square wave generator to insure well-defined oscillating and non-oscillating periods of the superregenerator 18 at the desired operating or quenching frequency.

The superregenerator 18 may also be designed to operate in the so-called logarithmic mode in which case the oscillating pulses $p_1$ build up to a constant amplitude, determined by the plate saturation current of the tube, while the received or reflected pulses $p_2$ have the effect of advancing or retarding the initiation of the oscillating pulses and to cause a variation of the width or length of the pulses. In other words, this results in a pulse width modulation in place of pulse amplitude modulation when the circuit is operated in the linear mode as in the case of Fig. 2. In the case of logarithmic operation, the limiter 26 may be replaced by conventional means for removing the pulse width modulation from the transmitted pulses to prevent reception of the passive signals by an unauthorized listener. Such an arrangement may consist of a differentiating circuit producing positive and negative pulses which are applied to a clipper to produce a series of transmitted R. F. pulses of equal length or width.

In order to derive the demodulated signals from the superregenerator, there is shown in Fig. 3 an audio frequency transformer 23 having its primary winding inserted in the plate circuit of superregenerator 18 and serving to excite an audio frequency amplifier 33 which in turn energizes a loudspeaker, telephone, or an equivalent output or translating device 34.

While a superregenerative transmitter-receiver has the advantage of great simplicity and high sensitivity in receiving the reflected signal pulses in a system of the type described, it is possible, according to another aspect of the invention, to employ a separate pulse transmitter and receiver such as is customary in conventional radar techniques. In this case, an amplitude limiter for removing the modulation from the transmitted pulses may be dispensed with.

Figure 4:
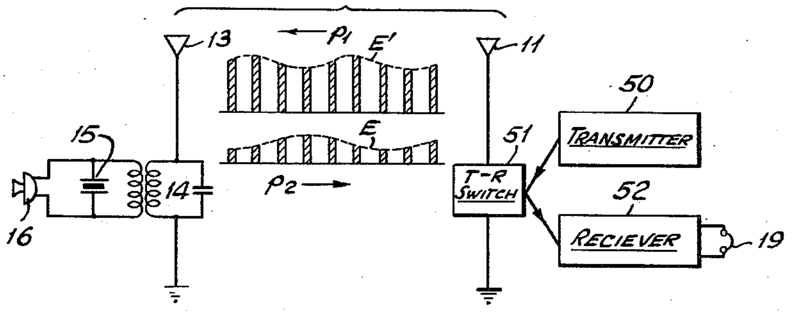
Fig. 4 is a block diagram of a modified system according to the invention, using a separate transmitter and receiver.

In an arrangement of this type, shown principally in block diagram form in Fig. 4, the transmitter 50 may be a pulse generator of the type used in radar or other pulse transmission systems, being provided with a suitable automatic transmit-receive switch 51, to prevent the transmitted pulses $p_1$ from affecting or entering the receiver 52, while allowing the received or reflected pulses $p_2$ to enter the receiver without interference by the transmitter. The responder again may consist of a piezoelectric crystal reflector 15 being suitably coupled to the antenna 13 through the tank circuit 14, to cause coupling oscillations or reverberation and a proper delay of the reflected or secondary pulses $p_2$, in the manner described and readily understood.

In place of a common transmit-receive switch, as shown in Fig. 4, a separate switching device or circuits may be provided in the transmitting and receiving channels, respectively, of the transmitter-receiver, to maintain a time division between the alternate transmitting and receiving pulses, substantially without interference or interaction between the circuits.

Figure 5:
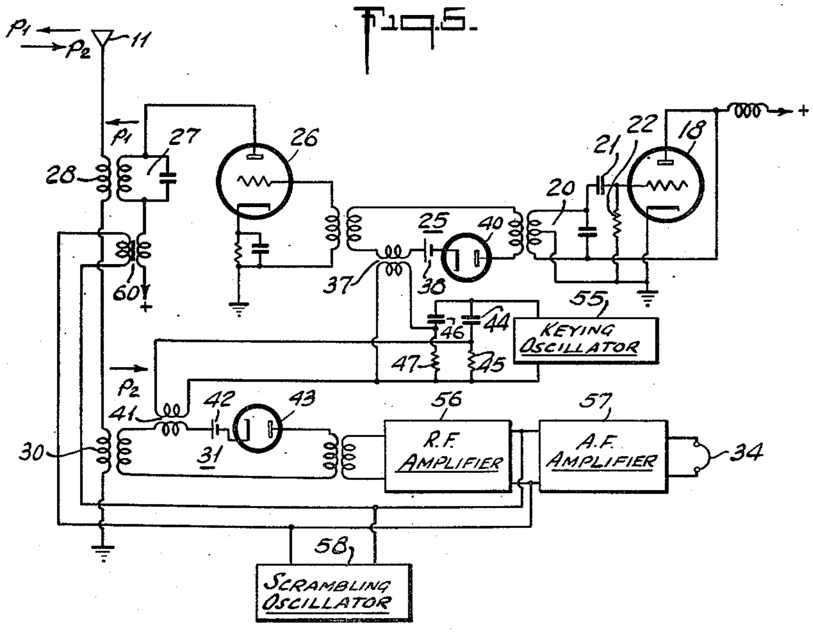
Fig. 5 is a more detailed circuit diagram of a separate transmitter-receiver of the type according to Fig. 4 embodying a signal scrambling and unscrambling arrangement according to the invention.

An arrangement of this type is shown in Fig. 5 wherein the generator 18 is a standard feedback oscillator producing a continuous carrier signal of constant amplitude by proper design of the grid coupling condenser 21 and grid leak resistance 22, in a manner well understood. The generated oscillations of constant amplitude are impressed upon the antenna circuit by way of the switching circuit 25 and power amplifier 26 in substantially the same manner as in Fig. 3 described hereinabove, to radiate a series of R. F. signal pulses $p_1$ of constant amplitude. The reflected and received pulses $p_2$ are applied to a separate R. F. amplifier 56 by way of the antenna coupling 30 and switching circuit 31. The R. F. amplifier 56 is followed in a conventional manner by an A. F. amplifier 57 including a detector or rectifier energizing a loudspeaker or headphone 34. The switching circuits 25 and 31 are controlled by a separate keying oscillator 55 through coupling networks 44, 45 and 46, 47 in such a manner as to render the transmitting and receiving channels alternately conductive and non-conductive to transmit primary pulses $p_2$ while blocking the receiver, on the one hand, and to render the receiver operative for the reflected pulses $p_2$ during the spacing intervals between the transmitted pulses, on the other hand. The keying oscillator may be in the form of a square wave generator, such as a multivibrator, to produce well-defined transmitting pulses and receiving intervals at a suitable rate or repetition frequency above the highest component frequency of the signals to be transmitted by the distant responder or control device.

In an arrangement of this type, i. e. where the carrier oscillations are of constant amplitude, it is not necessary to provide any amplitude limiter as in the case of a superregenerator, Fig. 3. As a result, the amplifier 26 may be designed efficiently to operate as a power stage, to transmit pulses of maximum amplitude and to improve the transmission range of the system.

While it is thus possible, by removing the modulation of the transmitted pulses by a limiter in the case of a combined transmitter-receiver, Fig. 3, or by avoiding any modulation of the transmitted pulses by the provision of a separate oscillator and receiver, Fig. 5, to prevent unauthorized reception of the radiated R. F. pulses $p_1$, there still exists the possibility for an unauthorized listener to receive the reflected pulses $p_2$ radiated by the responder by means of a sensitive receiver of suitable design and tuned to the R. F. or carrier frequency of the signal pulses.

In order to avoid such unauthorized reception and to afford absolute and complete secrecy, there is provided, according to a further improvement of the invention, an efficient and simple scrambling and unscrambling arrangement as shown in Fig. 5, comprising a scrambling oscillator 58 which serves to modulate the amplitude of the transmitted pulses $p_1$ by a suitable scrambling signal, preferably a signal in the form of a distorted or complex oscillation or signal wave. The latter may be produced by amplifying a noise signal or by distorting a sinusoidal oscillation and may have either a constant or varying shape and/or frequency to increase the degree of secrecy. In the example shown, the scrambling voltage or jamming signal is applied to the plate of the power amplifier 26 by way of a modulating transformer 60, to result in an arbitrary modulation of the transmitted pulses $p_1$ as indicated by the envelope E′ in Fig. 4.

The transmitted scrambled pulses are then in turn modulated by the responder at the remote station according to a desired signal, whereby to result in a double-modulation or jamming of the reflected signal pulses $p_2$ to render them unintelligible to an unauthorized listener or receiver, provided the use of a scrambling signal of suitable complex amplitude and wave shape. In order to render the received signals intelligible, an unscrambling signal is applied from the scrambling oscillator 58 to the input of the audio amplifier 57 in a proper phase and amplitude relation to the demodulated signals, in such a manner as to result in a cancellation of the scrambling component and to provide a clear unscrambled output signal energizing the headphone 34 or equivalent output device. Since the scrambling signal produced by the oscillator 58 may be chosen and/or varied in any suitable and arbitrary manner, it is practically impossible for an unauthorized receiver to unscramble the signals in an attempt to reproduce the variations of the scrambling signal or jamming schedule.

Figure 6:
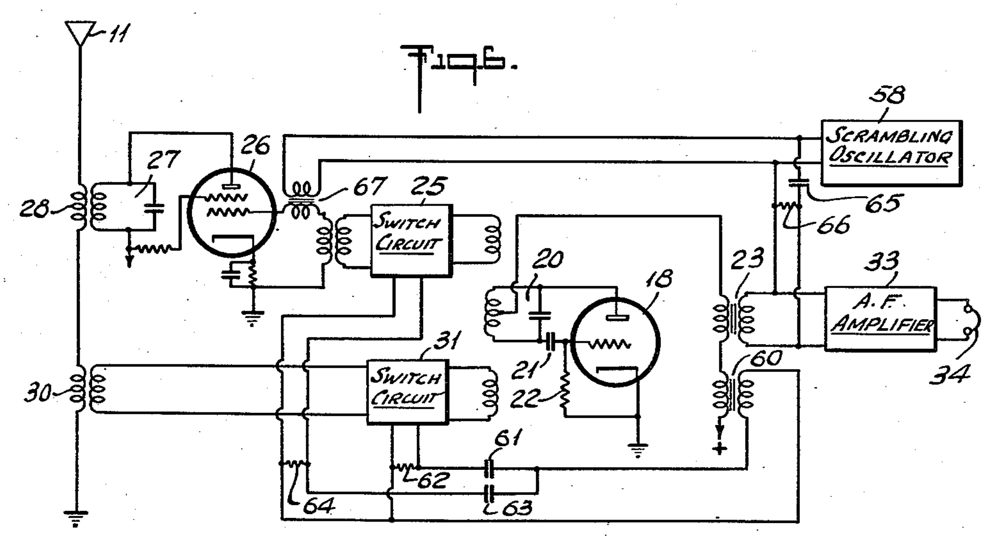
Fig. 6 is a circuit diagram of a modified superregenerative transceiver including a scrambling and unscrambling arrangement according to the invention.

It will be understood that the speech scrambling and unscrambling arrangement embodied in Fig. 5 may be incorporated in a superregenerative transceiver of either the separately-quenched type, Fig. 3, or of the self-quenched type, as shown in Fig. 6 to be described presently.

In the case of a separately quenched superregenerator according to Fig. 3 operated in the linear mode (see Fig. 2), the amplitude modulation of the transmitted pulses is first suppressed by means of an amplitude limiter in the manner described, such as by the circuit 25, and the pulses then re-modulated in the R. F. stage or antenna by the scrambling signal in any suitable manner, such as by varying the plate voltage of the amplifier 26 by the scrambling oscillator 58, in substantially the same manner as shown in Fig. 5. The scrambled radiated pulses are then in turn modulated by the responder in accordance with the desired signal and the reflected and detected signals unscrambled in the audio amplifier, in the same manner as shown and understood from Fig. 5.

The same applies where the superregenerator of Fig. 3 is operated in the logarithmic mode, in which case the detected signals will be amplitude modulated by the scrambling signal and width modulated by the desired signal transmitted by the responder, both modulations causing a variation of the steady plate current of the superregenerator. Unscrambling may be effected in the same manner as described and understood from the foregoing.

Fig. 6 shows a further modification of a scrambling and unscrambling system according to the invention embodied in a self-quenched superregenerative transceiver provided with an R. F. amplifier interposed between the superregenerator and transmitting antenna in a manner similar to Fig. 3. The super regenerator shown comprises the triode 18, oscillating circuit 20, grid condenser 21 and grid leak 22, arranged in a known manner to produce self-quenched oscillations determined by the time constant of the condenser 21 and resistance 22, the capacities between the internal electrodes of the tube being relied upon the provide regeneration in a manner well known. Since the oscillations are applied to the antenna 11 by way of a separate R. F. amplifier 26, a pair of switching circuits 25 and 31 are provided to prevent interaction between the transmitting and receiver channels, in substantially the same manner as in the case of Fig. 3. The switching currents having a frequency equal to the quench frequency are derived by way of a transformer 60 in the plate circuit of the superregenerator and a pair of R. C. coupling circuits comprising coupling condensers 61, 63 and resistors 62, 64, respectively.

Figure 7:
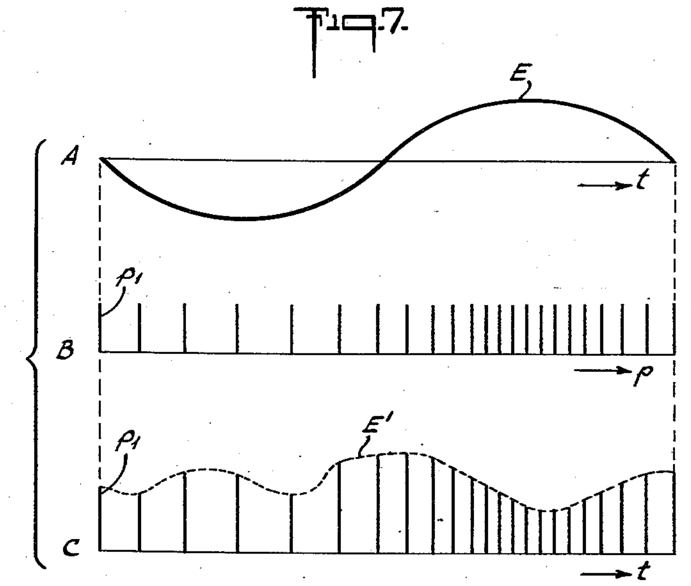
Fig. 7 shows a few theoretical curves explanatory of the function of Fig. 6.

In a superregenerator of this type the frequency or spacing of the transmitted pulses $p_1$ varies in accordance with the modulation of the received pulses by the signal transmitted by the responder in the manner shown in Fig. 7B, assuming a sinusoidal signal variation E as shown in Fig. 7A. According to the present invention, the transmitted pulses of normally constant amplitude are modulated in accordance with the scrambling signal or envelope E′ as shown in Fig. 7C, in such a manner as to produce reflected and detected signal pulses which are both amplitude and frequency modulated, both modulations causing a proportionate variation of the steady plate current of the superregenerator 18, in a manner well known.

In Fig. 6 the modulation of the transmitted pulses is effected by applying a portion of the outlet of the scrambling oscillator 58 to the grid of the R. F. amplifier 26 by way of a coupling transformer 67. In place of grid modulation it is understood that any other method of modulation may be employed for the purposes of the invention. Unscrambling of the demodulated output signals derived from the plate circuit of the superregenerator through the low frequency transformer 23 is effected by applying another portion of the output scrambling oscillator 58 to the input of the audio amplifier 33 by way of an R. C. coupling network comprising a condenser 65 and resistor 66, the phase and amplitude of the unscrambling current relative to the detected signals being such as to result in a substantial neutralization of the scrambling component in the final output signal applied to the headphone 34 or equivalent output device.

Figure 8:
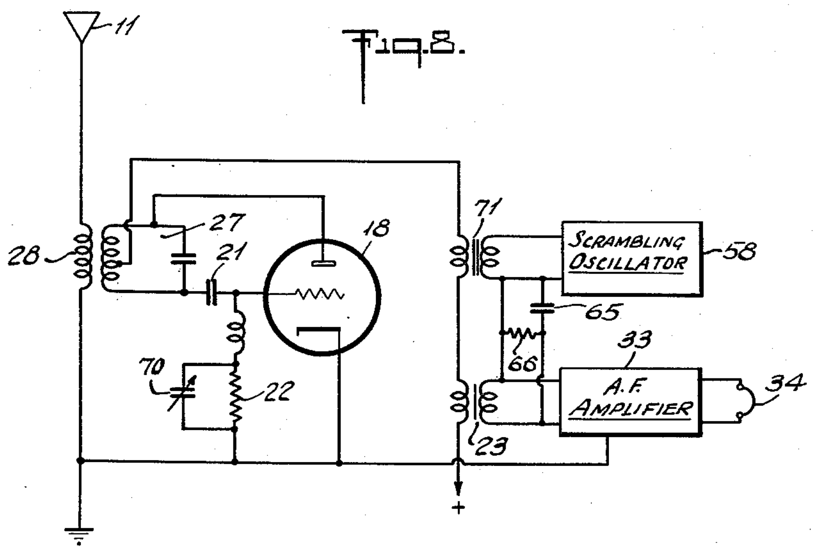
Figs. 8 and 9 illustrate simplified superregenerative transceiver circuits embodying secrecy signaling means according to the invention.

If a separate R. F. amplifier is not required the switching circuits 25 and 31 may be dispensed with, whereby to greatly simplify both the circuit and its operation. A simplified circuit of this type using a self-quenched superregenerator is shown in Fig. 8. In the latter the quenching frequency of the R. F. oscillations is determined by the grid leak resistance 22 and variable parallel condenser 70. This results in the generation of oscillation pulses of constant amplitude and varying frequency or spacing in accordance with a signal being transmitted by the responder, as shown in Fig. 7B. In addition to the frequency modulation, the transmitted pulses are amplitude modulated by the scrambling oscillator 58 coupled with the plate circuit through the coupling transformer 71. The combined frequency and amplitude modulated output signals in the plate circuit of the superregenerator are in turn applied to the input of the audio amplifier 33, unscrambling of the signals being effected by applying an unscrambling voltage of proper phase and amplitude derived from the scrambling oscillator 58, in substantially the same manner as shown in Fig. 6.

Figure 9:
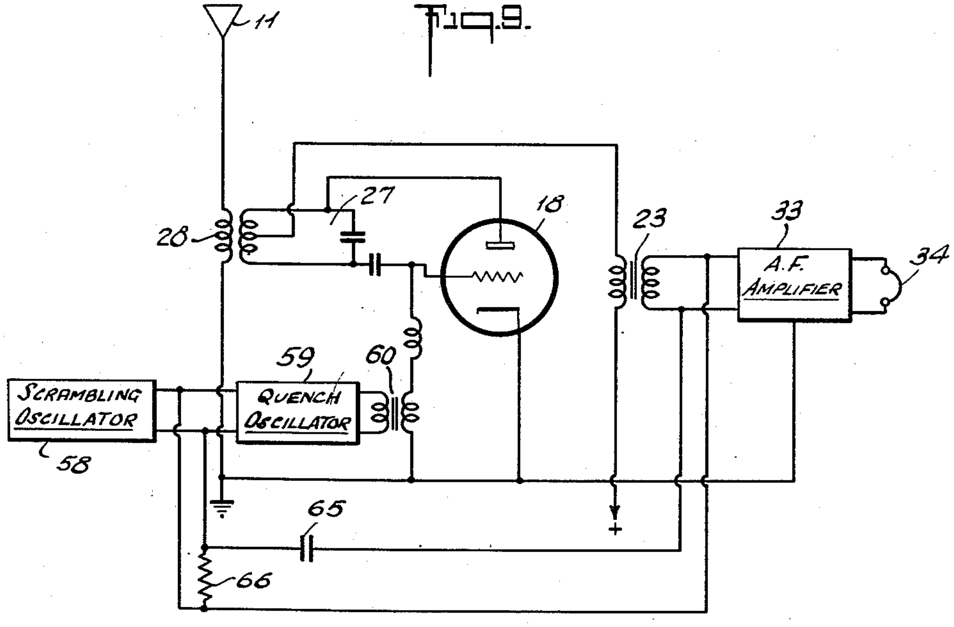

According to a modification of the circuit of Fig. 8 using a separately quenched superregenerator and shown by Fig. 9, a separate quenching oscillator 59 is coupled with the grid circuit of the tube 18 through a coupling transformer 60, the amplitude of the quenching oscillations being modulated by the scrambling signal provided by the oscillator 58. Assuming the superregenerator to be operated in the linear mode, the variation of the amplitude of the quenching oscillations will result in an amplitude modulation of the transmitted pulses by the scrambling signals, the pulses being then in turn modulated by the useful signal of the responder, whereby to result in a demodulated scrambled signal at the input of the audio amplifier 33. Unscrambling is effected in the manner as before by applying an unscrambling potential of the proper phase and amplitude from the scrambling oscillator 58 in a manner understood and shown in the drawing. The same circuit may be operated in the logarithmic mode in which the R. F. pulses will be amplitude modulated by the scrambling signal and width modulated by the desired signal, both modulations again resulting in a variation of the stready plate current of the superregenerator, with unscrambling of the signals being effected in substantially the same manner as described herein.

An advantage of this scrambling and unscrambling system for a passive responder of the type described is the fact that no coding or scrambling information has to be transmitted from one to another station, as is necessary in conventional secrecy transmission systems, thus resulting both in a great simplification of the circuits, as well as increased efficiency and dependability of the secrecy of the passive signal being transmitted.

In the foregoing the invention has been described with specific reference to a few illustrative circuits. It will be evident, however, that variations and modifications as well as the substitution of equivalent circuits and elements for those shown and disclosed may be made without departing from the broader scope and spirit of the invention as set forth in the appended claims. The specification and drawings are accordingly to be regarded in an illustrative rather than in a limiting sense.

I claim:

1. A radio transmission system comprising a transmitter located at a first point and adapted to transmit a series of primary radio frequency wave pulses, a passive responder located at a second point remote from said first point including antenna means for receiving said primary pulses and time-delay reflecting means to delay and retransmit the received pulses by said antenna means as secondary passive wave pulses during the spacing intervals between said primary pulses, means to modulate a characteristic of said secondary pulses in accordance with a signal to be transmitted from said second point to said first point, means at said first point for receiving said secondary pulses independently of said primary pulses, to produce a demodulated signal, a source of scrambling signals at said first point, means to modulate a characteristic of said primary pulses different from said first mentioned characteristic by a first signal component derived from said source, to produce a scrambling modulation component of said demodulated signal, and means to apply a further signal component from said source of proper phase and amplitude to said demodulated signal, to substantially cancel said scrambling component.

2. A radio transmission system comprising a superregenerative transceiver located at a first point to transmit a series of primary radio frequency wave pulses, a passive responder located at a second point remote from said first point including antenna means for receiving said primary pulses and time-delay reflecting means to delay and retransmit the received pulses by said antenna means as secondary passive wave pulses during the spacing intervals between said primary pulses, means to vary said secondary pulses in accordance with a signal to be transmitted from said second point to said first point, thereby to modulate said primary pulses and to produce a demodulated output signal by said transceiver, a source of scrambling signals at said first point, means to modulate a characteristic of said primary pulses different from the characteristic varied by said signal by a first scrambling signal component derived from said source, to produce a scrambling component of said demodulated signal, and means to apply a further scrambling signal component of proper phase and amplitude from said source to said demodulated signal, to substantially cancel said scrambling component.

3. A system as claimed in claim 2, wherein said superregenerative transceiver is of the self-quenched type and said first scrambling signal component modulates the amplitude of said primary wave pulses.

4. A system as claimed in claim 2, wherein said superregenerative transceiver is of the separately quenched type and said first scrambling signal component modulates the quenching frequency of said transceiver.

References Cited in the file of this patent

UNITED STATES PATENTS

| | | |
|---|---|---|
| 2,461,646 | Lewis | Feb. 15, 1949 |
| 2,511,409 | Mayberry | June 13, 1950 |
| 2,530,824 | King | Nov. 21, 1950 |
| 2,607,004 | Harris | Aug. 12, 1952 |

FOREIGN PATENTS

| | | |
|---|---|---|
| 312,079 | Great Britain | May 22, 1930 |